(No Model.) 3 Sheets—Sheet 1.

J. C. H. STUT.
CABLE TIGHTENER FOR CABLE RAILWAYS.

No. 427,205. Patented May 6, 1890.

Witnesses:
Inventor,
John C. H. Stut
by Dewey &c
attys (No Model.) 3 Sheets—Sheet 2.
J. C. H. STUT.
CABLE TIGHTENER FOR CABLE RAILWAYS.
No. 427,205. Patented May 6, 1890.
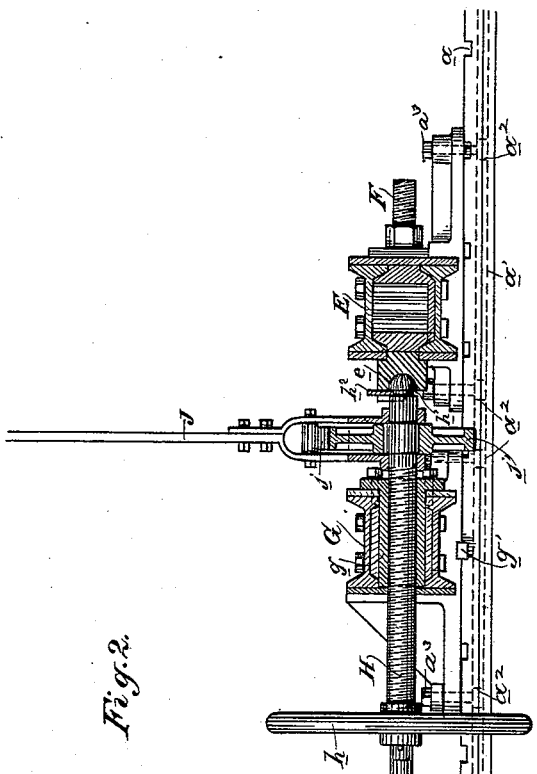
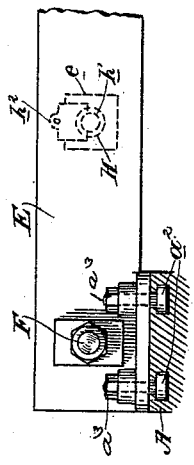
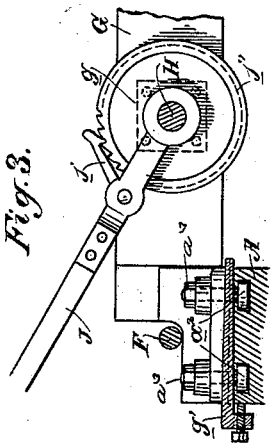
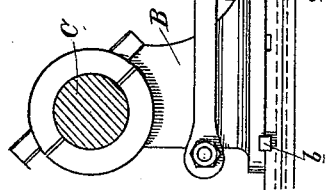
Witnesses:
Inventor,
John C. H. Stut,
By Dewey & Co.
Att'ys (No Model.) 3 Sheets—Sheet 3.

J. C. H. STUT.
CABLE TIGHTENER FOR CABLE RAILWAYS.

No. 427,205. Patented May 6, 1890.

Witnesses,

Inventor,
John C. H. Stut
By Dewey & Co.
Atty

UNITED STATES PATENT OFFICE.

JOHN CH. H. STUT, OF SAN FRANCISCO, CALIFORNIA.

CABLE-TIGHTENER FOR CABLE RAILWAYS.

SPECIFICATION forming part of Letters Patent No. 427,205, dated May 6, 1890.

Application filed November 15, 1889. Serial No. 330,454. (No model.)

*To all whom it may concern:*

Be it known that I, JOHN CHRISTIAN HENRY STUT, a citizen of the United States, residing at the city and county of San Francisco, and State of California, have invented an Improvement in Cable-Tighteners for Cable Railways; and I hereby declare the following to be a full, clear, and exact description thereof.

My invention relates generally to the class of cable railways in which a traveling cable moves in an underground tube or tunnel, and connection is made with it by means of a suitable grip extending from the car through a continuous slot in the top of the tube or tunnel, and it relates especially to that class of devices or apparatus for taking up the slack of the cable, and which are usually known as "cable-tighteners."

My invention consists, essentially, in a means whereby the slack cables of a cable system can be drawn tight while the cables are in motion. These means consist of novel constructions and combinations hereinafter fully described, and specifically pointed out in the claims.

Though my invention may be applicable to different arrangements of cables, it is applicable especially to that system known as the "windlass system," in which the driving-sheave has a certain number of grooves—say five or six—and the follower-sheave one groove less than the driving-sheave, so that the incoming cable goes around the driving-sheave first, and thence over the follower-sheave, and from this back and forth between the two sheaves, and finally leads off from the driving-sheave in the engine-house to the tube or tunnel under the street. It is in connection with this system that I have here illustrated my invention in the accompanying drawings, in which—

Figure 1:
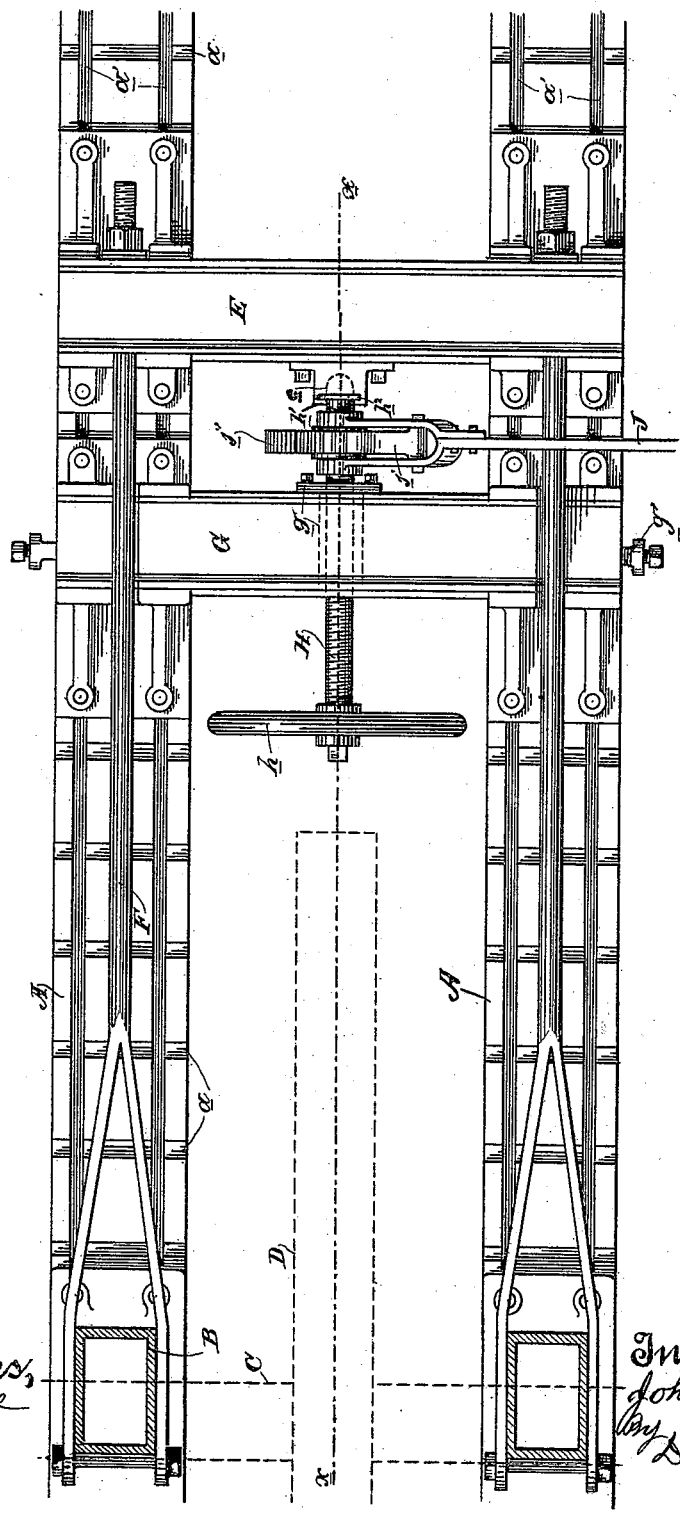
Figure 5:
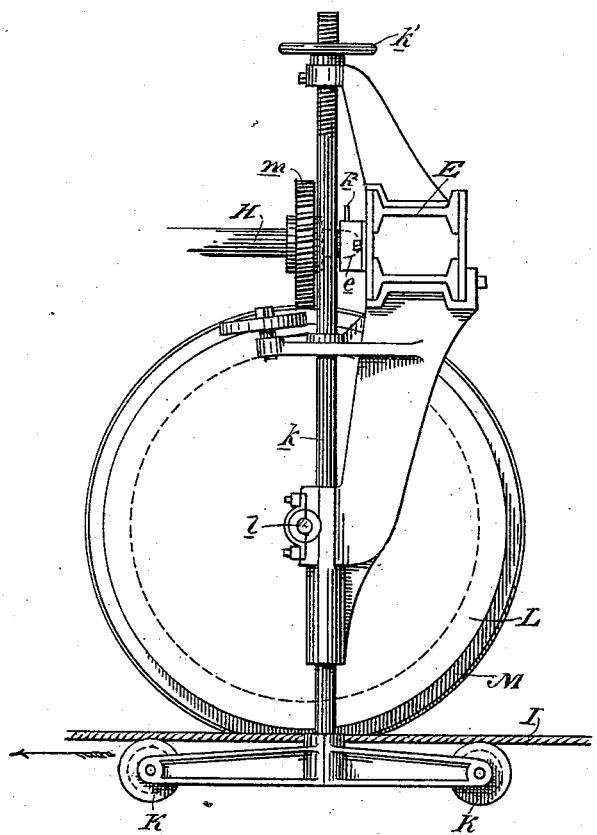

Figure 1 is a plan of my apparatus. Fig. 2 is a section through the line $x\ x$ of Fig. 1. Fig. 3 is a side elevation of the ratchet-lever and pawl mechanism. Fig. 4 is a rear elevation of part of cross-head E. Fig. 5 is a side elevation showing the power transmitted from the cable to the screw H.

A are the guides or ways on which are mounted and adapted to slide the boxes B of the shaft C, which carries the follower-sheave D.

I have not herein deemed it necessary to illustrate the driving-sheave, which is located at some distance beyond the follower-sheave, and to the first groove of which the incoming cable, which comes from the right, runs, thence passing over it and back again to the first groove of the follower-sheave, and around which it passes and forward to the second groove of the driving-sheave, and thence back again to the second groove of the follower-sheave, and so on until it leads off directly from the driving-sheave without touching the follower and goes out on its main course in the street. In this way the cable itself passes several times back and forth between the two sheaves, and it is from this peculiarity that the system derives its name of "windlass."

The cable tends constantly toward lengthening in the street, so that there is considerable slack to be taken up from time to time. Now it is obvious that by increasing the distance between the follower-sheave and the driving-sheave this slack from the street may be taken up. Consequently the follower-sheave is mounted in boxes which are adapted to slide upon the ways or guides. To effect this sliding motion of the follower-sheave my invention is intended; and it consists of the following construction:

Upon the ways or guides A, at a suitable distance back of the follower-sheave, is mounted and adapted to slide a cross-head or bearing E.

F are connecting-rods secured at their forward ends to the sliding boxes B of the follower-sheave, and thence extending backwardly and secured to the cross-head E in any suitable manner, as by passing through them and receiving a nut.

Mounted upon the ways or guides A, at a point between the follower-sheave and the cross-head E, is a cross-head or bearing G, in the middle of which is a nut $g$. Seated in this nut is the operating-screw H, having on one end a hand-wheel $h$, and having its other end extending to and engaging a socket $e$ in the face of the cross-head E. This engagement may be of any suitable character, as it is intended that by the operation of the screw the cross-head shall be forced backwardly. I prefer to make the connection by inserting the rounded end of the screw in a suitable cap bolted to the cross-head and having lugs through which a vertical slot is made, and in order to make a proper connection for drawing the cross-head G up to normal position after operation I make an encircling groove $h'$ on the end of the screw, and into this I drop a key-plate $h^2$ through a slot in the cap-lugs, so that the screw may have its rotary motion unimpeded, and yet when tending to withdraw will be connected with the cross-head, so that if said cross-head be held stationary on the ways or guides the cross-head G will be moved up by turning the screw by its hand-wheel to resume its normal position again. (See Fig. 2.) The screw may be operated by any suitable means, either by hand or by the application of power direct from the inleading cable I, or by mechanism driven from the shaft of the follower-sheave. The first of these motions is shown by the swinging hand-lever J, having a pawl $j$, which engages a ratchet $j'$ on the screw.

The means for operating the screw H by power derived from the cable are shown in Fig. 5, and consist of the following constructions: Under the cable I are located two lifting-rollers K, which are secured in the lower end of a vertically-movable rod $k$, which passes upwardly within reach and is operated by means of a screw $k'$ at the top. Directly above the cable is a grooved sheave L, mounted upon a counter-shaft $l$, and upon this same shaft is mounted a worm-wheel M, which meshes above with the worm $m$ on the screw H. Now by raising the lifting-rollers K the cable is raised up into contact with the grooved sheave, so that said sheave is rotated and transmits its power through the worm-wheel and worm to the screw.

The ways or guides A are made with transverse grooves $a$ at regular intervals, which are adapted to receive keys, in order to firmly and rigidly connect the boxes of the follower-sheave and the cross-head G with said ways or guides when necessary. The keys for the boxes are represented by $b$ and those for the cross-head G by $g'$. These keys may be readily inserted and as easily removed when the several parts are required to be removed, and by reason of the number of the key ways or grooves $a$ it is obvious that the parts may be set at almost any position desired.

In the guides or ways A are made the longitudinal grooves $a'$, which have an inverted-T shape in cross-section. Into these grooves are fitted the T-headed bolts $a^2$, which are seated in the boxes B and the cross-heads E and G and receive nuts $a^3$ on their tops for tightening them. These bolts serve as guides for the several parts in their movements and also as means for holding them down to the ways.

The operation of the invention is as follows: It is customary in all cable systems to use what is known as an "automatic tightener-carriage," over which the cable passes. This carriage is a freely-sliding one and is affected by a suspended weight, so that it constantly acts on the cable to hold it taut, giving under the strain of the cable and yielding to the weight as the cable slacks. This carriage has of course but a certain limit of play, and as the cable slacks up more and more it is obvious that the automatic carriage would be carried beyond its limits, and therefore it becomes necessary to take up this slack of the cable permanently by other means. Now, by observing the automatic tightener-carriage it will be seen from its position when it is necessary that a more permanent taking up of the slack must be had. Therefore when this becomes evident it is necessary to operate the invention heretofore described, which is done as follows: The keys $g'$ are placed in the keyways and bolts $a^2$ tightened, so as to firmly and solidly connect the cross-head G with the ways or guides A. Then the keys $b$ of the follower-sheave boxes B are removed and their bolts $a^2$ loosened, and the bolts $a^2$ of the cross-head E also are loosened. I will state at this point that it should be understood that all the cables are in motion and that it is not necessary to stop them, as the entire operation may be carried out without a moment's stop of the cables. When the keys $b$ are removed and bolts loosened, so as to free the follower-sheave boxes, the entire strain is carried by the fixed cross-head G, which, through its screw H, holds the sliding cross-head E, to which the boxes of the follower-sheave are connected. Therefore said sheave may continue in operation, being held to its place by the fixed cross-head G. Now the ratchet-lever J is operated so as to turn the screw H, which, working through its fixed nut $g$, forces backwardly the cross-head E, and thereby draws back the boxes B and carries back the follower-sheave, thus taking up the slack. As soon as the slack is sufficiently taken up the keys $b$ are again inserted in new places and the bolts tightened, so as to hold the follower-sheave, and then the bolts $a^2$ are tightened to hold the cross-head E, and the keys $g'$ are removed and its bolts loosened. By then turning the screw H, which is connected with the cross-head E by means of the key-plate $h^2$, the cross-head G will be run up to its original position with respect to the sliding cross-head E, and the parts then resume their places ready for the next operation. In this windlass system there is intense strain upon the follower-sheave, resulting from the large number of passes of the cable between it and the driving-sheave. Changes of temperature and strain on the cables along the road cause the cables to become somewhat slack, and the movement of the follower-sheave, as heretofore described, takes up this slack. This movement of the follower-sheave with its bearings, in order to take up slack, has always been a great source of trouble and delay, for the strain on said sheave, even with a slack cable, is so intense that the whole system of cables in an engine-house had to be stopped when slack had to be taken up, the cables slipped around the sheaves by hand, and then the follower-sheave and its bearings drawn back by means of chain and rope tackles, all of which causes a great delay and expense. By my device these difficulties are all overcome, and its operation may be readily effected while the cable is in motion and all the slack taken in over the whole cable, presenting a great distinction to the old system, wherein a portion of the cable nearest the engine-house only can be tightened.

By my device the slack over the entire cable while the cable is running is gradually taken up, for the device is operated very slowly, so that the cable has to pass at least once entirely around its course before all the slack is taken in.

It is evident that if it be desired to operate the machine by any other power instead of by the hand-lever, as heretofore described, the cable may be raised into connection with the grooved sheave, as before mentioned, and thus the power of the cable itself may be transmitted to operate the screw H and take up the slack.

If in putting back the boxes of the follower-sheave one should move slightly ahead of the other, this can be remedied by setting up the nut on the end of the opposite connecting-rod F, so that the sheave will be brought straight again.

Having thus described my invention, what I claim as new, and desire to secure by Letters Patent, is—

1. In a cable-tightener, and in combination with the adjustable or movable follower-sheave, a sliding bearing with which said sheave is connected, a fixed bearing connected with and holding the sliding bearing to sustain the strain on the follower-sheave, and a mechanism between the fixed bearing and the sliding bearing for moving the latter, whereby the follower-sheave may be moved back to tighten the cable, substantially as described.

2. In a cable-tightener, and in combination with a follower-sheave and its movable boxes, a sliding bearing with which said boxes are connected, a fixed bearing connected with and holding the sliding bearing to sustain the strain of the follower-sheave, and a mechanism between the two bearings whereby the sliding bearing may be moved back to draw with it the follower-sheave and tighten the cable without stopping the same, substantially as described.

3. In a cable-tightener, and in combination with the follower-sheave and its movable boxes, a sliding bearing with which said boxes are connected, a fixed bearing, and a power-screw threaded in the fixed bearing and connected with the sliding bearing, whereby the latter is held to sustain the strain of the follower-sheave and moved to draw back said sheave to tighten the cable, substantially as described.

4. In a cable-tightener, and in combination with the follower-sheave and its movable boxes, a sliding cross-head, the connecting rods or bars F, joining the boxes of the follower-sheave with said cross-head, a fixed cross-head, and the power-screw seated in said fixed cross-head and connected with the sliding cross-head, whereby the latter is moved to draw back the follower-sheave and tighten the cable, substantially as described.

5. In a cable-tightener, and in combination with the follower-sheave and its movable boxes, the sliding cross-head E and connections for holding it stationary when required, the fixed cross-head G and connections for relieving it, whereby it may slide when required, the power-screw seated in the cross-head G and connected with the cross-head E, whereby the latter may be moved and the former returned to position, and the rods F, connecting the sliding boxes of the follower-sheave with the sliding cross-head, substantially as described.

6. In a cable-tightener, the combination of the ways or guides having the keyways $a$, the follower-sheave and its boxes mounted and adapted to slide upon said guides or ways, and removable keys for holding the boxes in position and freeing them when necessary, the sliding cross-head E, mounted upon said guides or ways, the rods or bars F, connecting said cross-head with the follower-sheave boxes, cross-head G, mounted and adapted to slide upon said ways or guides and having removable keys for fixing it in position, and the power-screw seated in the cross-head G and connected with the cross-head E, substantially as described.

7. In a cable-tightener, the combination of the ways or guides having the longitudinal T-shaped grooves $a'$, the follower-sheave and its boxes mounted and adapted to slide upon said guides or ways and held thereto by T-headed bolts $a^2$, seated in said boxes and fitting in the grooves $a'$, the sliding cross-head E, mounted on said guides or ways and held thereto by T-headed bolts fitting in grooves $a'$, the cross-head G, mounted on the ways or guides and held thereto by T-headed bolts fitting in grooves $a'$, the screw seated in the cross-head G and connected with cross-head E, and the rods or bars F, connecting the cross-head E with the follower-sheave boxes, substantially as described.

8. In a cable-tightener, the combination of the ways or guides having the transverse keyways $a$ and the longitudinal T-shaped grooves $a'$, the follower-sheave and its boxes mounted and adapted to slide on said guides or ways and held thereto by T-headed bolts fitting in the grooves, and removable keys for holding the boxes rigidly and freeing them when necessary, the sliding cross-head E, mounted on said guides or ways and held thereto by T-headed bolts fitting in the grooves, the rods or bars F, connecting said cross-head with the follower-sheave boxes, the cross-head G, mounted and adapted to slide upon said ways or guides and held thereto by T-headed bolts fitting in the grooves, and removable keys for fixing it in position, and the screw seated in the cross-head G and connected with the cross-head E, substantially as described.

9. In a cable-tightener, the combination of the follower-sheave with its sliding boxes, the sliding cross-head E, connected with the boxes, the cross-head G, the power-screw threaded in the cross-head G and connected with the sliding cross-head, and the means for imparting rotation to said screw, consisting of the lifting-rollers under the cable, the sheave with which the cable is brought into contact when lifted, the worm-wheel on the shaft of said sheave, and the worm on the screw, substantially as described.

10. In a cable-tightener, the cross-heads E and G, by which the follower-sheave is moved, as described, in combination with the screw H, seated in the cross-head G and connected rotatively with the cross-head E, and means for running the cross-head G up to normal position again, substantially as described.

11. In a cable-tightener, the cross-head G, having the nut $g$, and the screw H, seated in said nut and having an encircling groove on its end, in combination with the cross-head E, having the cap with lugs, and in which the end of the screw is fitted, and the locking or key plate $h^2$, dropped through a slot in the cap-lugs and entering the groove of the screw end, substantially as described.

In witness whereof I have hereunto set my hand.

JOHN CH. H. STUT.

Witnesses:
JAS. TOBIN,
J. H. BLOOD.